United States Patent

Ellis

[11] Patent Number: 6,008,779
[45] Date of Patent: Dec. 28, 1999

[54] NIGHT VISION VIEWING SYSTEMS

[75] Inventor: Stafford Malcolm Ellis, East Preston, United Kingdom

[73] Assignee: Gec-Marconi Limited, United Kingdom

[21] Appl. No.: 07/172,335

[22] Filed: Mar. 10, 1988

[30] Foreign Application Priority Data

Mar. 24, 1987 [GB] United Kingdom .................... 8706943
Jul. 31, 1987 [GB] United Kingdom .................... 8718177

[51] Int. Cl.⁶ .............................. G09G 5/00; G02B 27/14; G02F 1/01
[52] U.S. Cl. .............................. 345/8; 250/330; 359/630; 359/632
[58] Field of Search .......................... 350/174; 340/705; 345/8; 359/630, 632; 250/330

[56] References Cited

U.S. PATENT DOCUMENTS

| 4,361,384 | 11/1982 | Bosserman | 350/174 |
| 4,439,755 | 3/1984 | LaRussa | 350/174 |
| 4,465,347 | 8/1984 | Task et al. | |
| 4,563,061 | 1/1986 | Ellis | 350/174 |
| 4,735,473 | 4/1988 | Migozzi et al. | 350/174 |
| 4,743,200 | 5/1988 | Welch et al. | 340/705 |
| 4,753,514 | 6/1988 | Kubik | 350/174 |

FOREIGN PATENT DOCUMENTS

| 0 077 193 A2 | 4/1983 | European Pat. Off. |
| 0 134 116 A2 | 3/1985 | European Pat. Off. |
| 0 206 324 A2 | 12/1986 | European Pat. Off. |
| 0252200 | 1/1988 | European Pat. Off. |
| 1 527 049 | 10/1978 | United Kingdom . |
| 2 100 466 | 12/1982 | United Kingdom . |
| 2100466 | 12/1982 | United Kingdom . |
| 2 108 702 | 5/1983 | United Kingdom . |
| 2108702 | 5/1983 | United Kingdom . |
| 2 144 558 | 3/1985 | United Kingdom . |
| 8504961 | 11/1985 | WIPO . |
| WO 86/05281 | 9/1986 | WIPO . |

OTHER PUBLICATIONS

Cook, SPIE, vol. 193, Optical Systems Engineering, 1979, p. 153, 350–174.
Yoder, SPIE Journal, vol. 9, No. 1, Oct.–Nov. 1970, p. 5.

*Primary Examiner*—Stephen C. Buczinski
*Attorney, Agent, or Firm*—Kirschstein, et al.

[57] ABSTRACT

A night vision viewing system (13a or 13b) suitable for mounting on an observer's headgear (11) wherein light rays from a forward scene pass to the observer's eye (E) via a path comprising a forward looking objective lens (19), a first inclined reflector (23) which directs the rays upwardly onto the input face of a downward-looking image intensifier (25). Intensified rays from the image intensifier pass, in turn, via a fibre optic stub image rotator (27), a second inclined reflector (29), a relay lens arrangement (31) and third and fourth inclined reflectors (33) and (35), the fourth reflector directing the rays downwardly into an eyepiece (15) which is in the observer's forward line of sight. The eyepiece (15) incorporates an internal surface (39) having both light reflective and light transmissive properties which directs rays entering the eyepiece (15) from the intensifier (25) to the observer's eye. The fibre optic stub serves to effect rotation of the intensified image to present an intensified image of correct orientation to the observer. The configuration of the system allows the possibility of achieving an optimal position for the centre of gravity of the system in relation to the neck pivot position of the observer.

19 Claims, 3 Drawing Sheets

NIGHT VISION VIEWING SYSTEMS

BACKGROUND OF THE INVENTION

1. Field of the Invention

This invention relates to night vision viewing systems.

More particularly, the invention relates to night vision viewing systems of a kind suitable for support on headgear to provide a wearer of the headgear with an intensified view of a scene ahead of the wearer superimposed on and in register with the wearer's direct view of said scene.

2. Description of Related Art

A known such system comprises an eyepiece arranged to intercept a forward line of sight of an observer using the system, and an optical sub-system including a forward-looking objective lens fixed with respect to said eyepiece and having an optical axis offset with respect to said forward line of sight, and an image intensifier means disposed optically between said objective lens and said eyepiece so that light rays of an intensified real image of a scene forward of the observer viewed by said objective lens are directed into said eyepiece via an input surface thereof which faces upwardly with respect to said forward line of sight, thereby to provide the observer with a view of said intensified image which is superimposed on and in register with the observer's direct view of said forward scene through said eyepiece.

Such a night vision viewing system is hereinafter referred to as a night vision viewing system of the kind specified.

It will be appreciated that whilst a night viewing system of the kind specified gives the observer a monocular view only of the distant scene, two such systems may be used, one for each eye of the observer, to provide a binocular view. Moreover, the two such systems may, at least in part, share a common optical sub-system so that the observer is provided with a biocular view only.

Known night vision viewing systems in which the system is supported on headgear have certain inherent shortcomings when used in environments such as the cockpit of a high performance aircraft. Inevitably the centre of gravity of the night vision system is at a position forward of the neck pivot position of the headgear wearer. The weight of the night vision system is, generally speaking, of the order of 1 kg; and, heretofore the moment arm about the neck pivot position has been around 13 cms. In static conditions therefore the user must develop a balancing torque of about 1.3 newton meters. Under high gravitational force manoeuvre conditions any unbalanced mass of quite small magnitude may constitute a danger to the wearer.

SUMMARY OF THE INVENTION

It is an object of the present invention to provide a night vision viewing system of the kind specified wherein these shortcomings are alleviated.

According to the present invention in a night vision system of the kind specified said optical sub-system is arranged so that said image intensifier means is downward-looking with respect to said forward line of sight.

Preferably said objective lens is positioned so as to be closely adjacent a side of the face of the observer in use of the system, rearwardly of said eyepiece in respect of said forward line of sight, and preferably said image intensifier means is similarly positioned. In one particular arrangement said objective lens and image intensifier are positioned so that, with the night vision system supported on a headgear for use by an observer wearing the headgear, one or both of them occupy a position substantially aligned in the headgear fore and aft direction with a side portion of the headgear.

The optical sub-system will normally include image rotating means between the image intensifier means and eyepiece to provide the observer with a view of the intensified image of the correct orientation with respect to the distant scene. The rotation means suitably comprises a fibre optic stub optically connected at one end to an output face of the image intensifier means.

In one particular arrangement according to the invention the optical sub-system further includes: first light reflecting means positioned so as to direct light received from said forward scene via said objective lens upwardly onto an input face of said image intensifier means; a relay lens arrangement; second light reflecting means positioned between said image intensifier means and said relay lens arrangement so as to direct light received from the image intensifying means forwardly, downwardly and inwardly, through said relay lens arrangement; third light reflecting means positioned so as to redirect substantially horizontally inwardly light directed through said relay lens arrangement by said second reflecting means; and fourth light reflecting means positioned so as to redirect said light redirected by said third reflecting means downwardly onto said input surface of the eyepiece.

In one such an arrangement said second reflecting means has light transmittive properties as well as light reflective properties, and the system further includes a display arrangement for directing light representing a display via said second reflecting means through said relay lens arrangement, and hence, after reflection at said third and fourth reflecting means, into said eyepiece for viewing by said observer in corresponding manner to said intensified image.

The invention also provides a night vision viewing system comprising two night vision viewing systems according to the invention, one for each eye of the observer.

In a night vision viewing system in accordance with the invention the or each eyepiece is preferably of the kind comprising a body of light refractive material having: a substantially flat upper input surface via which said rays enter the eyepiece; fore and aft substantially flat surfaces spanned by said input surface; and an internal surface between said fore and aft surfaces which is concavely curved towards said aft surface and which possesses both light reflecting and light transmitting properties; said input, fore, aft and internal surfaces being angularly mutually disposed so that said rays from said intensified real image, after entering said body, are internally reflected forwardly towards said interval surface, are reflected at said internal surface rearwardly towards said aft surface, and finally are transmitted through said aft surface to an observer's design eye position.

Such an eyepiece is hereafter referred to as an eyepiece of the kind specified.

Night vision viewing systems incorporating eyepieces of the kind specified are described in GB-A-2108702 and GB-A-2144558.

In GB-A-2108702 the eyepiece is in two parts; the internal surface is in the form of a coating of appropriate light transmissive and light reflective properties at a curved surface formed by complementary convexly and concavely curved surfaces of the two parts. In such an eyepiece, rays entering the refractive body at the upper surface are totally internally reflected at the aft surface.

In GB-A-2144558 the eyepiece is in three parts, there being two internal surfaces one of which is the said surface concavely curved towards the aft surface and the other of which is a substantially flat surface between the concavely curved internal surface and the aft surface. With this eyepiece light rays entering the body at the upper surface are totally internally reflected at the said other internal surface towards the concavely curved surface and are there reflected rearwardly for transmission through said other internal surface and then said aft surface to the observer's eye.

The eyepieces of the night vision viewing systems of GB-A-2108702 and GB-A-2144558 are functionally similar, but the eyepiece of GB-A-2144558 may be made substantially more compact than that of GB-A-2108702 the latter eyepiece having, in the context of headgear systems at least, a substantial angle of rake to its fore and aft surfaces, as a result of its two-part construction. In the eyepiece of GB-A-2144558 a much smaller angle of rake of the fore and aft surfaces may be achieved and the eyepiece may be brought closer to the eye position. Accordingly, a larger field of view may be so obtained, retaining the overall dimensions in the eyepieces; or (perhaps more important) a smaller eyepiece may be employed to achieve a field of view equivalent to that obtainable with a substantially larger eyepiece of the two-part construction of GB-A-2108702.

Thus an eyepiece of the kind described in GB-A-2144558 is in general preferred for use in a system according to the present invention.

It should be understood that whilst the several said surfaces of an eyepiece of the kind specified are stated to be substantially flat it may be convenient or advantageous to give these surfaces or any of them a degree of curvature in order to ameliorate optical defects necessarily present in the system. Astigmatism, in particular, must be present; the off-axis nature of the system in which the eyepiece is employed makes this unavoidable. Accordingly references, in this specification, to flat surfaces, should be construed with the foregoing in mind, it being a matter of preference and not of the essence that the said surfaces should be other than flat since corrective optical elements could be located at other places in the optical system.

The combined effect of the several elements employed in a night vision system according to the invention is such that the system is of minimal weight and of minimal moment arm about the neck pivot position.

BRIEF DESCRIPTION OF THE DRAWINGS

One night vision viewing system in accordance with the invention for use by the pilot of a high performance aircraft supported on the pilot's helmet will now be described, by way of example, with reference to the accompanying drawings in which.

DETAILED DESCRIPTION OF THE PREFERRED EMBODIMENT

Figure 1:
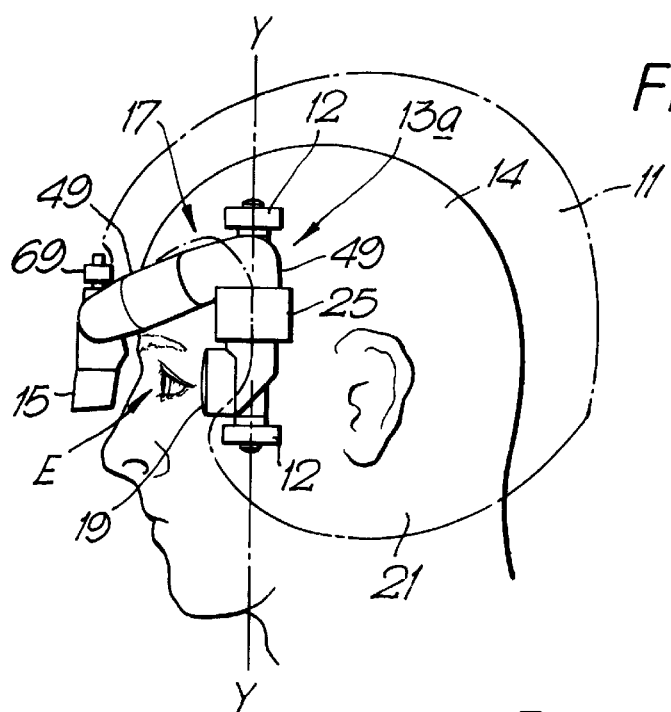
FIG. 1 is a side view of the system.

Referring to the drawings, the system is mounted on a helmet 11 and is a binocular night vision system comprising two night vision systems 13a, 13b, one for each eye of a wearer of the helmet 11.

Figure 2:
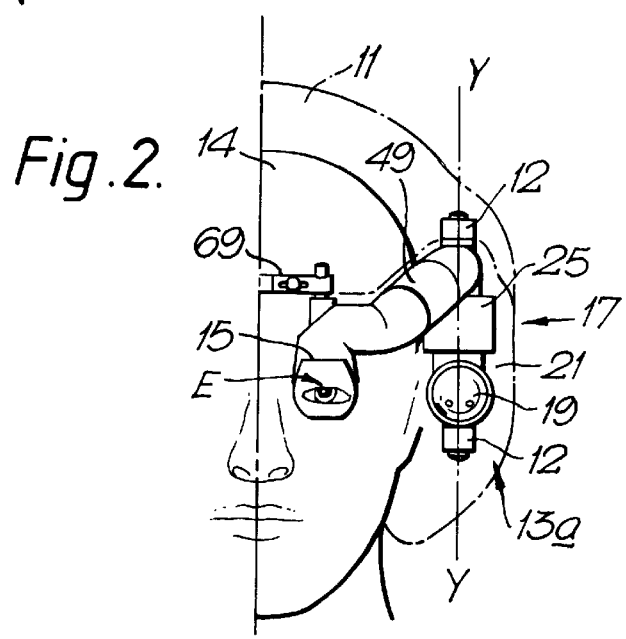
FIG. 2 is a half front view of the system.

The night vision viewing systems 13a, 13b are each separately supported on the helmet 11, one at each side of the helmet, for pivotal movement about respective vertical axes Y—Y between operative and inoperative positions, as hereinafter further described. To this end, each system 13a or 13b is mounted between upper and lower bearing blocks 12 secured to the helmet 11 at positions such that a vertical part of the system between the blocks 12 lies within the thickness of the helmet 11, i.e. between the outer surface of a side portion of the helmet and the adjacent side of the helmet wearer's head 14, as best seen in FIG. 2.

Each of the systems 13a, 13b comprises an eyepiece 15 which is positioned in front of a respective eye E of the helmet wearer when the system is in the operative position, and an optical sub-system 17.

Each of the optical sub-systems 17 includes an objective lens 19 which, when in the operative position, is offset laterally and rearwardly with respect to its associated eyepiece 15 so as to occupy a position alongside the temple of the helmet wearer and substantially aligned in the helmet fore and aft directions with a side portion 21 of the helmet 11, i.e. a portion of the helmet 11 dependent from the upper, generally hemispherical, portion of the helmet enclosing the upper part of the helmet wearer's head 14.

Each optical sub-system further comprises a first planar reflector 23 positioned behind the objective lens 19 and inclined to the optical axis thereof so as to direct light passing through the objective lens 19 from the forward scene upwardly onto the input face of a downward-looking image intensifier 25 whose axis substantially coincides with the axis Y—Y. The output face of the image intensifier 25 is associated with image rotation means in the form of a coherent fibre optic stub 27 having one end face in optical abutment with the output face of the intensifier and secured thereto using an optical cement. Above the free upper end face of the stub 27, which is parallel to its other lower end face, there is a second planar reflector 29 which is inclined to the axis of the image intensifier 25 so as to direct light incident on it from the stub 27 forwardly, and slightly inwardly and downwardly so as to pass via a relay lens arrangement 31 onto a third planar reflector 33. The third reflector 33 is positioned and inclined with respect to the relay lens arrangement 31 so as to direct light from the relay lens arrangement 31 horizontally and inwardly onto a fourth planar reflector 35 which, in turn, is inclined and positioned so as to direct light received from the reflector 33 downwardly and slightly rearwardly so as to enter the eyepiece 15 via an upper input surface 37.

Each eyepiece 15 consists of light refractive material, preferably a transparent plastics material, and includes an internal surface 39 having both light transmissive and light reflective properties. The surface 39 is at the interface between two parts A and B of the eyepiece 21. The part A has an optically flat upper surface which constitutes the input surface 37 of the eyepiece 21, an optically flat aft surface 41 and a fore surface concavely curved towards the aft surface 41, which fore surface is bonded to a complementary aft surface of the part B to form the surface 39. The part B has an optically flat fore surface 43 which constitutes a second input face of the eyepiece 21. The eyepiece 21 is completed by a third wedge shaped part C having a fore major surface 45 in parallel spaced relation to the surface 41 and an aft major face 47 parallel to the surface 43.

The required optical properties at the surface 39 are suitably conferred by a semi-silvered mirror coating or a holographic coating.

Figure 3:
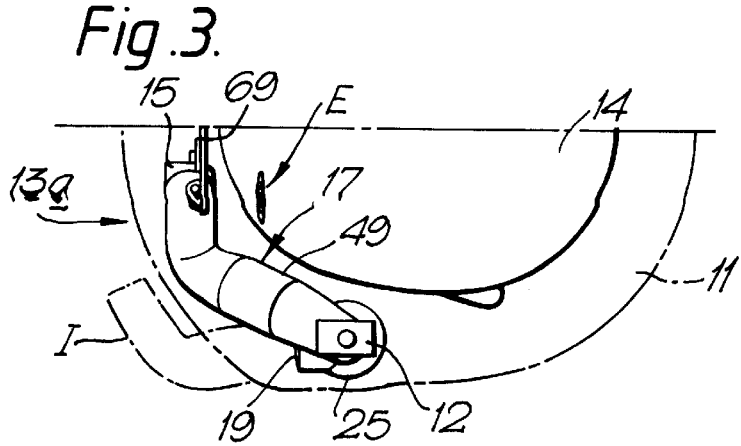
FIG. 3 is a half plan view of the system.

The various optical elements of each optical sub-system 19 and the associated eyepiece 15 are housed within and supported by a protective casing 49 (see FIGS. 1, 2 and 3).

In operation of the binocular night vision system rays from a forward distant scene, represented by the upper case letter F in the drawings, are received at the objective lens 19 of each of the component night vision systems 13a, 13b, and are brought to a focus as an image of the scene at an image plane coincident with the input face of the image intensifier 25 by reflection from the first reflector 23.

An intensified representation of this image is developed at the output face of the intensifier 25 and transmitted through the coherent fibre optic stub 27.

The reflectors 29, 33 and 35 and the relay lens arrangement 31 serve to produce at a plane $0_1$ a real image of the image appearing at the upper end face of the fibre optical stub 27.

The image plane $0_1$ coincident with the focal plane of concavely curved surface 39 within the eyepiece 15. Rays from the image plane $0_1$ enter the eyepiece 15 via the surface 37 and are totally internally reflected at the surface 41 of the eyepiece towards the curved surface 39. The rays incident on the surface 39 from the surface 41 are reflected backwards to be transmitted through the surface 41 and then through the rear part C of the eyepiece 15 to the helmet wearer's eye E.

Since the rays originate, so far as the eyepiece 15 is concerned, at the principal focal plane of the eyepiece 15, essentially the surface 39, an intensified virtual collimated image of the forward scene as viewed through the objective lens 19 is seen by the eye E.

The fibre optic stub 27 is of a twisted construction, the angle of twist being such that the combined optical effect of the optical sub-system 17 and the eyepiece 15 on rays from the forward distant scene F is such that a virtual intensified representation of the distant scene of the correct orientation is seen by the eye E. Moreover, by virtue of the parallel relationship of the eyepiece overall fore and aft surfaces 43 and 47, the virtual intensified image seen by the eye E is in register with the view from the position of the eye E of the forward distant scene directly through the eyepiece 15 provided by light rays from the scene passing through the eyepiece 15 via surfaces 43, 39, 41, 45 and 47, in turn.

In practice the image rotation required in the stub 27 is of the order of 90°, the precise angle being determined by the detailed configuration.

The system may further include a display arrangement for presenting further optical data to the eyes E of the helmet wearer, superimposed on the direct and intensified views of the distant scene.

Figure 4:
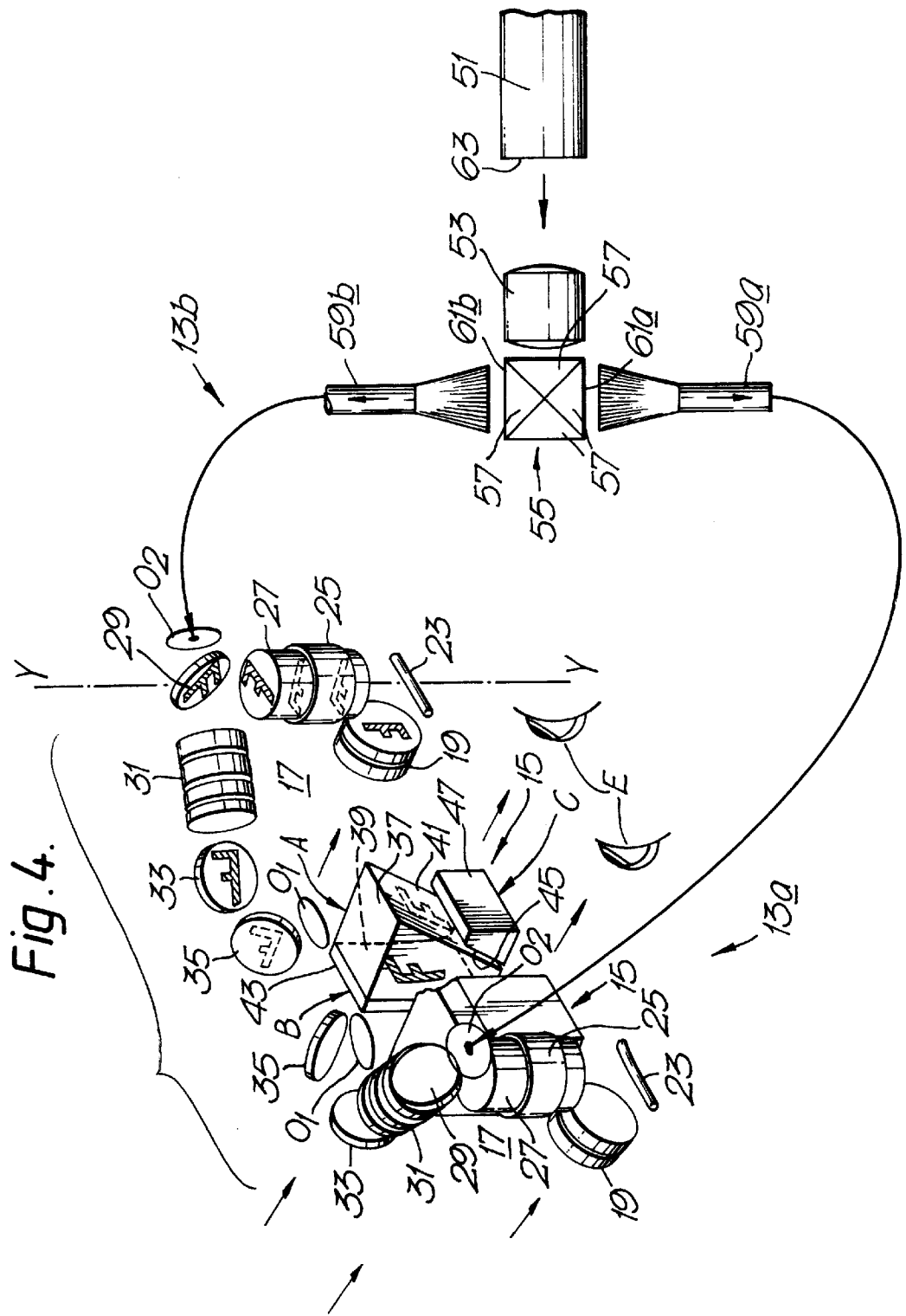
FIG. 4 is a diagram illustrating the optical arrangement of the system.

To this end, as illustrated in FIG. 4, in each of the night vision systems 13a, 13b the second planar reflector 29 is made so as to serve as a beam splitter and a display arrangement carried by the helmet 11 produces a bright display image in a plane $0_2$ whose position in relation to the relay lens arrangement 31 corresponds with that of the output end of the fibre optic stub 27. Consequently, light from the aforesaid bright display image transmitted through the associated reflector 29 is brought to a focus by the relay lens at the real image plane $0_1$ for viewing at the eye E via the eyepiece 15.

The display arrangement comprises a cathode ray tube 51, a relay lens 53, a cuboidal beam splitter 55 composed of four right prisms 57 in apex to apex relationship with the opposed faces bonded together by an optical cement and with a semi-reflective coating on one of each such opposed faces. Two coherent fibre optic bundles 59a, 59b, respectively have end faces respectively located adjacent two opposite parallel sides 61a, 61b, of the beam splitter 55 in planes respectively, congruent with real image planes of the relay lens 53 in relation to the object plane defined by the screen 63 of the cathode ray tube 51. The planes of the ends of the fibre optic bundles 59a, 59b remote from the cuboidal beam splitter 55 are congruent with the planes $0_2$.

Since rays must pass through two optical coatings to produce at the eyepieces 15 virtual images of even brightness of the cathode ray tube bright display image the optical coatings at the internal faces of the beam splitter 55 have a reflectivity of 70% and a transmissivity of 30%.

Figure 5:
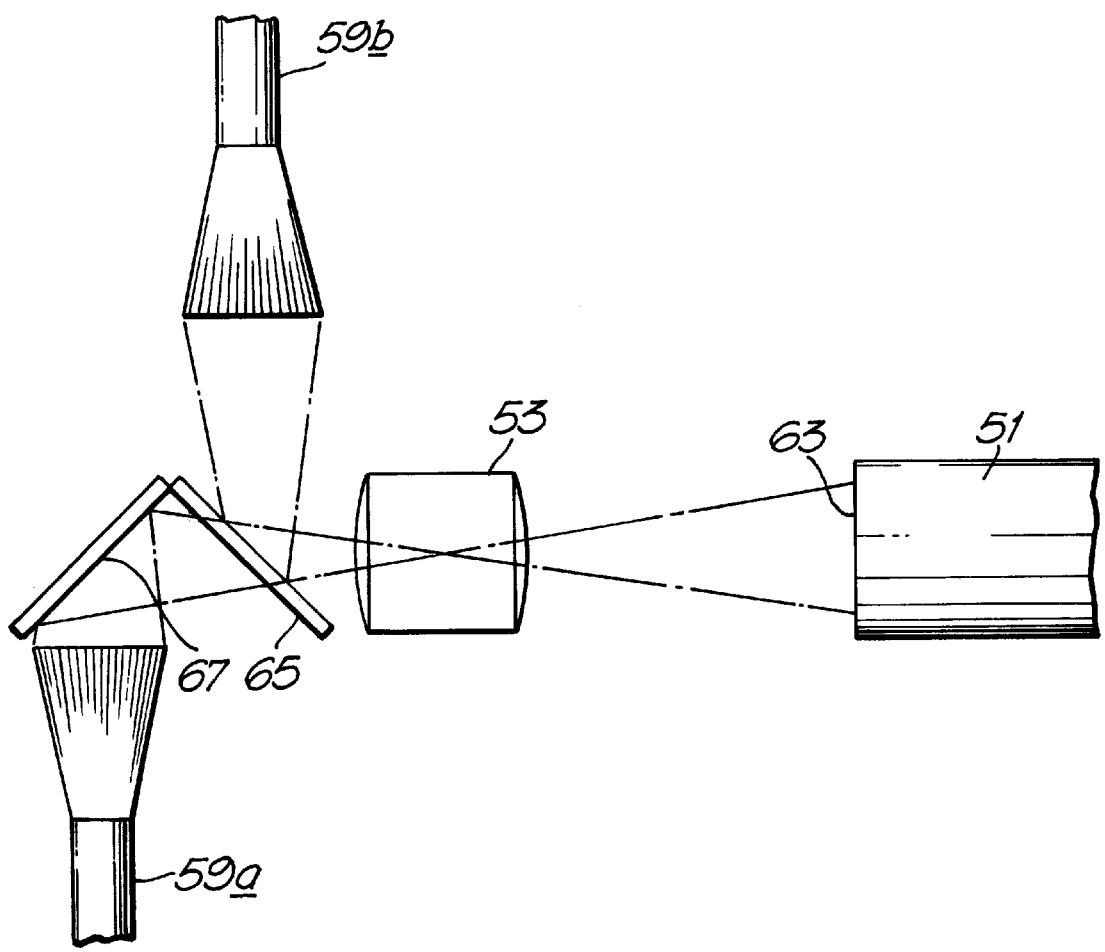
FIG. 5 is a diagram illustrating an alternative form of part of the system.

In an alternative display arrangement, instead of the cuboid beam splitter 55 two planar reflectors 65 and 67 inclined to one another at right angles may be employed as shown in FIG. 5, one reflector 65 being semi-silvered, i.e. 50% reflector 50% transmitter and the other 67 reflector being a full reflector.

In a further alternative display arrangement (not shown) two cathode ray tubes may be used each of which directs light onto the end of a respective one of the fibre optic bundles 51a and 51b. To this end, the ends of the bundles 51a and 51b preferably directly abut the screens of the cathode ray tubes.

The two night vision systems 13a, 13b are hingedly supported on the helmet 11 to allow them to be swung outwardly about the pivot axes Y—Y to an inoperative position indicated by chain dotted line I in FIG. 3 to facilitate the donning and doffing of the helmet. Pivotal movement of the two systems 13a, 13b is produced by pulling forwardly or pushing backwardly on a pin and the slot coupling 69 extending between the two systems 13a, 13b near the brow portion of the helmet 11. Alternatively, a cam and follower mechanism (not shown) may be provided whereby the systems 13a, 13b are caused to pivot when a vizor (not shown) fitted to the helmet is raised and lowered. Such arrangements form the subject of United Kingdom patent application No. 8706943.

The configuration of a binocular night vision system according to the invention, particularly in respect of the downwardly looking aspect of the or each image intensifier and consequent position of the or each objective lens, and when using an eyepiece or eyepieces of the above described three part kind, offers the possibility of achieving an optimal centre of gravity position in relation to the neck pivot position of a user of the system. Moreover, the weight of the system is low by comparison with known systems offering a similar angular field of view.

It will be understood that whilst the system described by way of example is a binocular night vision viewing system other systems in accordance with the invention may comprise a biocular night vision system, or a monocular night vision system leaving the other eye of the user an uninterrupted view of the forward distant scene. Similarly a display arrangement for optical data need not be provided in a night vision viewing system in accordance with the invention.

I claim:

1. A night vision viewing system comprising: an eyepiece arranged to intercept a forward line of sight of an observer using the system, and an optical sub-system including a forward-looking objective lens fixed with respect to said eyepiece and having an optical axis offset with respect to said forward line of sight, and an image intensifier means having an input face and an output face and disposed optically between said objective lens and said eyepiece so that light rays from a scene forward of the observer viewed by said objective lens are directed onto said input face and light rays of an intensified real image of said scene produced on said output face are directed into said eyepiece via an input surface thereof which faces upwardly with respect to said forward line of sight, thereby to provide the observer with a view of said intensified image which is superimposed on and in register with the observer's direct view of said forward scene through said eyepiece, said optical sub-system being arranged so that said input face of said image intensifier means is downward-looking with respect to said forward line of sight, said optical sub-system being arranged so that said image intensifier means is positioned to lay closely adjacent a side of the head of the observer in use of the system, to reduce the moment of said optical sub-system about a neck pivot position of the observer.

2. A system according to claim 1 wherein said objective lens is positioned so as to lie closely adjacent a side of the head of the observer in use of the system.

3. A system according to claim 2 wherein said objective lens is positioned rearwardly of said eyepiece with respect to said forward line of sight.

4. A system according to claim 1 wherein said image intensifier means is positioned rearwardly of said eyepiece with respect to said forward line of sight.

5. A system according to claim 1 supported on a headgear for use of an observer wearing the headgear.

6. A system according to claim 5 wherein said objective lens occupies a position substantially aligned in the headgear fore and aft direction with a side portion of the headgear.

7. A system according to claim 5 wherein said image intensifier means occupies a position substantially aligned in the headgear fore and aft direction with a side portion of the headgear.

8. A system according to claim 5 wherein said system is supported on said headgear for pivotal motion between operative and inoperative positions about an axis defined by the headgear which extends substantially vertically with respect to said forward line of sight at one side of the headgear.

9. A system according to claim 8 wherein said axis defined by said headgear is substantially coincident with an axis of said image intensifier means.

10. A system according to claim 1 wherein said optical sub-system includes image rotating means between said image intensifier means and said eyepiece.

11. A system according to claim 10 wherein said image rotation means comprises a fibre optic stub optically connected at one end to the output face of said image intensifier means.

12. A system according to claim 1 wherein said eyepiece comprises a body of light refractive material having: a substantially flat upper input surface via which said rays enter the eyepiece; fore and aft substantially flat surfaces spanned by said input surface; and an internal surface between said fore and aft surfaces which is concavely curved towards said aft surface and which possesses both light reflecting and light transmitting properties; said input, fore, aft and internal surfaces being angularly mutually disposed so that said rays from said intensified real image, after entering said body, are internally reflected forwardly towards said internal surface, are reflected at said internal surface rearwardly towards said aft surface, and finally are transmitted through said aft surface to an observer's design eye position.

13. A system according to claim 12 wherein said eyepiece has two internal surfaces one of which is said internal surface concavely curved towards said aft surface and the other of which is a substantially flat surface between said concavely curved internal surface and said aft surface; said input, fore, aft and two internal surfaces being angularly mutually disposed so that light rays from said intensified image, after entering said body, are internally reflected forwardly at said other internal surface, and are then reflected at said one internal surface rearwardly for transmission through said other internal surface and then said aft surface to the observer's design eye position.

14. A system according to claim 1 wherein said optical sub-system further includes: first light reflecting means positioned so as to direct light received from said forward scene via said objective lens upward onto the input face of said image intensifier means; a relay lens arrangement; second light reflecting means positioned between said image intensifier means and said relay lens arrangement so as to direct light received from the output face of the image intensifier means forwardly, downwardly and inwardly, through said relay lens arrangement; third light reflecting means positioned so as to redirect substantially horizontally inwardly light directed through said relay lens arrangement by said second reflecting means; and fourth light reflecting means positioned so as to redirect said light redirected by said third reflecting means downwardly onto said input surface of the eyepiece.

15. A system according to claim 14 wherein said second reflecting means has light transmissive properties as well as light reflective properties, and the system further includes a display arrangement for directing light representing a display via said second reflecting means through said relay lens arrangement, and hence, after reflection at said third and fourth reflecting means, into said eyepiece for viewing by said observer in corresponding manner to said intensified image.

16. A night vision system comprising two night vision systems according to claim 1, one for each eye of the observer.

17. A night vision system comprising two night vision systems according to claim 15, one for each eye of the observer, wherein said display arrangement comprises: a cathode ray tube; a second relay lens arrangement; a beam splitter comprising four right angled prisms united apex to apex and provided at opposed faces with coatings possessing light reflecting and light transmitting properties; and first and second coherent fibre optic bundles; light from a real image presented at a screen of said cathode ray tube being brought to a focus by said second relay lens arrangement in conjunction with said beam splitter at one end of each of said first and second fibre optic bundles, and the other ends of said fibre optic bundles being positioned to direct light through said second reflecting means respectively.

18. A system comprising two night vision systems according to claim 15, one for each eye of the observer, wherein said display arrangement comprises: a cathode ray tube; a second relay lens arrangement; fifth and sixth light reflecting means inclined to one another at right angles and disposed on the optical axis of said second relay lens arrangement with said fifth light reflecting means nearer said second relay lens arrangement, said fifth light reflecting means being partially light transmissive and partially light reflective and said sixth light reflecting means being fully reflective; and first and second coherent fibre optic bundles; light from a real image presented at a screen of said cathode ray tube being brought to a focus by said second relay lens arrangement at one end of one of said fibre optic bundles after reflection at said fifth light reflecting means, and at one end of the other of said fibre optic bundles after passage through said fifth light reflecting means and reflection at said sixth light reflecting means, the other ends of said fibre optic bundles being positioned to direct light through said second light reflecting means respectively.

19. A system comprising two night vision systems according to claim 15 one for each eye of the observer, wherein said display arrangement comprises two cathode ray tubes and two fibre optic bundles; each said fibre optic bundle having one end optically connected to a screen of a respective one of said cathode ray tubes, and its other end positioned to direct light through a respective one of said second light reflecting means.

* * * * *